United States Patent
Cheng et al.

(10) Patent No.: US 8,582,039 B2
(45) Date of Patent: Nov. 12, 2013

(54) NAKED-EYE TYPE STEREOSCOPIC DISPLAY

(75) Inventors: Hsiao-Chung Cheng, Tainan (TW);
Chun-Hsien Yeh, Taipei (TW);
Jen-Chieh Chen, Changhua County (TW); Chen-Lun Chiu, Taoyuan County (TW); Chung-Ming Shen, Taipei (TW);
Chien-Feng Chiu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 122 days.

(21) Appl. No.: 13/400,550

(22) Filed: Feb. 20, 2012

(65) Prior Publication Data
US 2013/0135541 A1    May 30, 2013

(30) Foreign Application Priority Data
Nov. 30, 2011    (TW) .............................. 100143988 A

(51) Int. Cl.
*G02F 1/1339*    (2006.01)

(52) U.S. Cl.
USPC ............................................................. 349/8

(58) Field of Classification Search
USPC ............................................................. 349/8
See application file for complete search history.

(56) References Cited

U.S. PATENT DOCUMENTS
7,027,043 B2    4/2006    Sakaki

FOREIGN PATENT DOCUMENTS
JP    09-244048    9/1997
TW    I285950    8/2007

*Primary Examiner* — Phu Vu
(74) *Attorney, Agent, or Firm* — Jianq Chyun IP Office

(57) ABSTRACT

A naked-eye type stereoscopic display including a display panel, a polarization switching panel, and a lens array is provided. The display panel provides an image having a first polarization state. The polarization switching panel and the lens array are disposed on a propagation path of the image, and the polarization switching panel is located between the lens array and the display panel. In addition, the polarization switching panel has at least one rescue line so as to lower the scrap rate of the polarization switching panel.

8 Claims, 7 Drawing Sheets

NAKED-EYE TYPE STEREOSCOPIC DISPLAY

CROSS-REFERENCE TO RELATED APPLICATION

This application claims the priority benefit of Taiwan application serial no. 100143988, filed on Nov. 30, 2011. The entirety of the above-mentioned patent application is hereby incorporated by reference herein and made a part of this specification.

BACKGROUND OF THE DISCLOSURE

1. Field of the Disclosure

The document relates to a stereoscopic display panel. More particularly, the application relates to a naked-eye type stereoscopic (or namely auto-stereoscopic) display panel.

2. Description of Related Art

In recent years, as display technology advances, users of displays have become more and more demanding on display quality (such as image resolution, color saturation, and so forth). Nevertheless, in process of purchasing a display, whether the display is able to display stereoscopic images or not has been little by little taken into consideration in addition to high image resolution and high color saturation.

At present, three-dimensional (3D) image display technologies may be roughly categorized into stereoscopic technologies which require a viewer to wear specially designed glasses and naked-eye type stereoscopic (namely auto-stereoscopic) technologies that allow a viewer to directly watch images with naked eyes. The stereoscopic display technologies have been maturely developed and broadly applied to certain fields including military simulation or large-scale entertainment events. However, due to the disadvantages of discomfort and inconvenience, the stereoscopic display technologies are rather difficult to be popularized. Instead, the naked-eye type stereoscopic display technologies have been gradually developed and become the new trend.

In general, according to the naked-eye type stereoscopic display technologies, a polarization switching panel and a lenticular lens array are required to be configured in front of a display panel, such that the image displayed on the display panel can be divided into a left-eye image and a right-eye image. Since the naked-eye type stereoscopic display is mainly constituted by the display panel, the polarization switching panel, and the lenticular lens array, the manufacturing yield of the naked-eye type stereoscopic display may be affected by the yield of the display panel, the yield of the polarization switching panel, the yield of the lenticular lens array, and so on.

Accordingly, how to improve the manufacturing yield of the naked-eye type stereoscopic display and further reduce the manufacturing costs is one of the technical issues to be resolved imminently.

SUMMARY OF THE DISCLOSURE

The one aspect is directed to a naked-eye type stereoscopic display of which a polarization switching panel has a rescue line design and is thus characterized by favorable reliability.

In the aspect, a naked-eye type stereoscopic display that includes a display panel, a polarization switching panel, and a lens array is provided. The display panel provides an image having a first polarization state. The polarization switching panel is located on a propagation path of the image. Besides, the polarization switching panel includes a first substrate, a second substrate, and a liquid crystal layer. The first substrate has a first conductive pattern, a first dielectric layer covering the first conductive pattern, a second conductive pattern disposed on the first dielectric layer, a first driver, and a second driver. The first conductive pattern includes a plurality of first fan-out conductive wires connected to the first driver, a plurality of second fan-out conductive wires connected to the second driver, a first portion, and a plurality of second portions located among the first fan-out conductive wires. The second conductive pattern includes a plurality of first electrodes connected to the first fan-out conductive wires and a plurality of third portions intersecting the first fan-out conductive wires. Here, the first portion intersects the first electrodes, and the first portion, the second portions, and the third portions together formed a first rescue line. The second substrate has a plurality of second electrodes, and the second fan-out conductive wires are electrically connected between the second electrodes and the second driver. The liquid crystal layer is configured between the first substrate and the second substrate. The lens array is located on the propagation path of the image, and the polarization switching panel is located between the lens array and the display panel.

According to an embodiment in the aspect, the display panel includes a liquid crystal display (LCD) panel, and the first polarization state is a linear polarization state.

According to an embodiment in the aspect, when the polarization switching panel is disabled, a polarization of the image passing the polarization switching panel switches from the first polarization state to a second polarization state different from the first polarization state; when the polarization switching panel is enabled, the polarization of the image passing the polarization switching panel stays in the first polarization state.

According to an embodiment in the aspect, the first substrate further includes a first alignment film, and the second substrate further includes a second alignment film. Here, an alignment direction of the first alignment film is substantially parallel to a polarization direction of the linear polarization state, and an alignment direction of the second alignment film is substantially perpendicular to the alignment direction of the first alignment film.

According to an embodiment in the aspect, the first conductive pattern is a metal pattern, for instance, and the second conductive pattern is a transparent conductive pattern, for instance.

According to an embodiment in the aspect, the polarization switching panel further includes a sealant and a plurality of transfer members. The sealant is disposed between the first substrate and the second substrate, and the transfer members are disposed in the sealant. The second electrodes are electrically connected to the second fan-out conductive wires through the transfer members.

According to an embodiment in the aspect, the second substrate further includes a fourth portion intersecting the second electrodes; the first conductive pattern further includes a fifth portion and a plurality of sixth portions, wherein the fifth portion is connected to the fourth portion through one of the transfer members, and the sixth portions are located among the second fan-out conductive wires; the second conductive pattern further includes a plurality of seventh portions intersecting the second fan-out conductive wires. The fourth portion, the fifth portion, the sixth portions, and the seventh portions together formed a second rescue line.

According to an embodiment in the aspect, the lens array includes a plurality of lens portions substantially arranged in parallel and a dielectric layer. Each of the lens portions has birefringence, and the dielectric layer covers the lens portions. A refractive index of the dielectric layer is substantially identical to a long axial refractive index (ne) or a short axial refractive index (no) of each of the lens portions.

Based on the above, the rescue lines are configured on the polarization switching panel in the application. Therefore, the scrap rate of the polarization switching panel in the naked-eye type stereoscopic display can be significantly reduced, and the yield of the naked-eye type stereoscopic display can be improved to a great extent.

To make the above and other features and advantages of the application more comprehensible, several embodiments accompanied with figures are detailed as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles in the application.

DESCRIPTION OF EMBODIMENTS

Figure 1A:
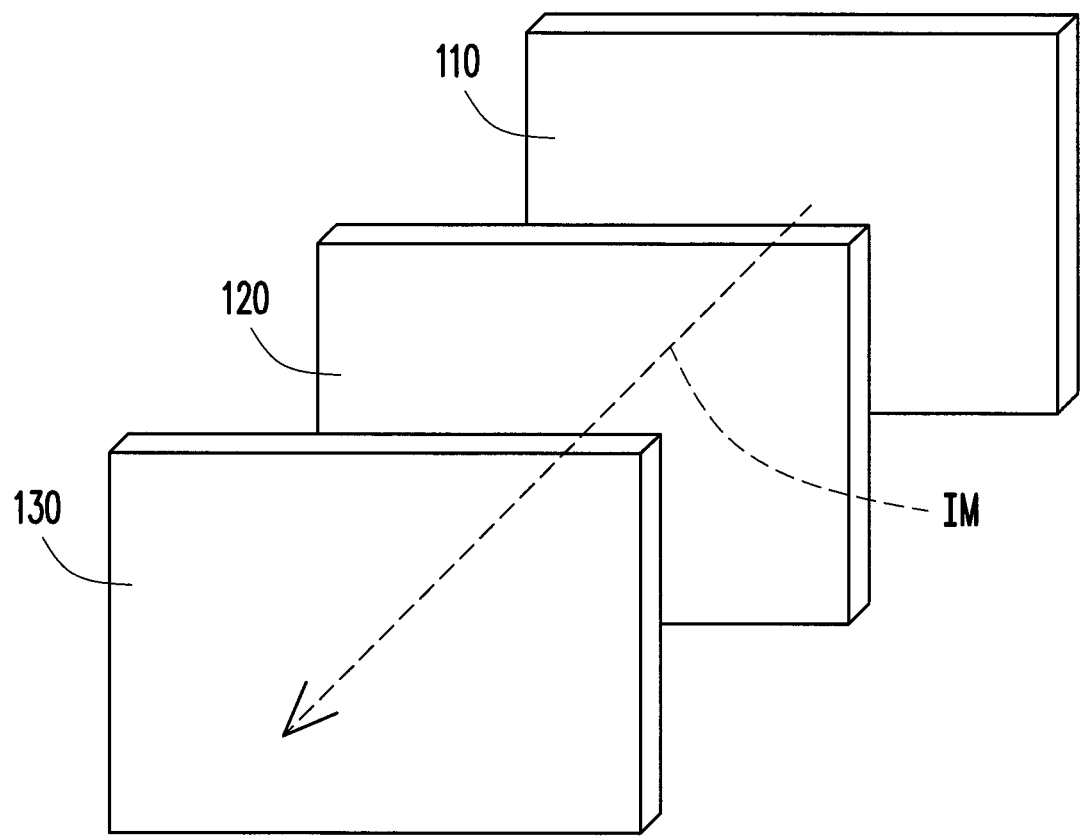
FIG. 1A is a schematic view illustrating a naked-eye type stereoscopic display according to an exemplary embodiment.
Figure 1B:
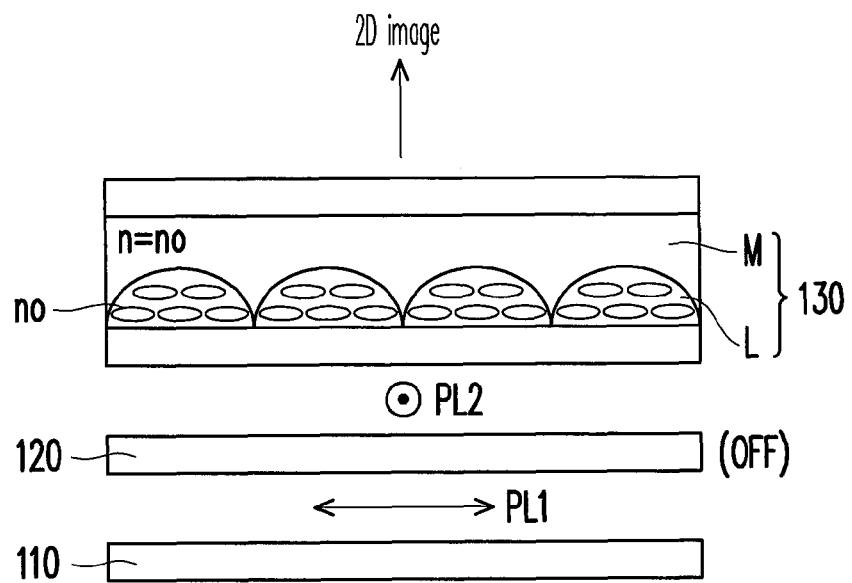
FIG. 1B and FIG. 1C are schematic views illustrating the naked-eye type stereoscopic display displaying a two-dimensional (2D) image and a stereoscopic image.
Figure 1C:
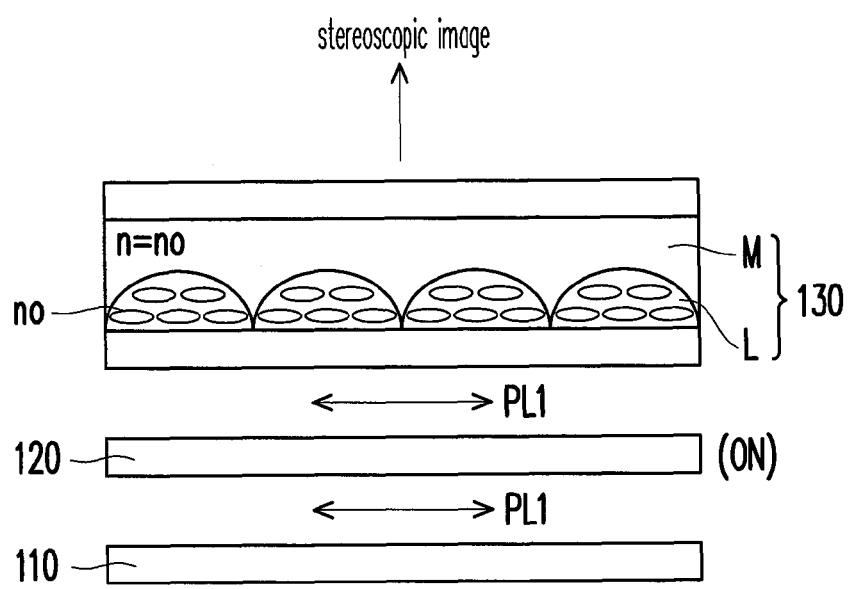
Figure 2:
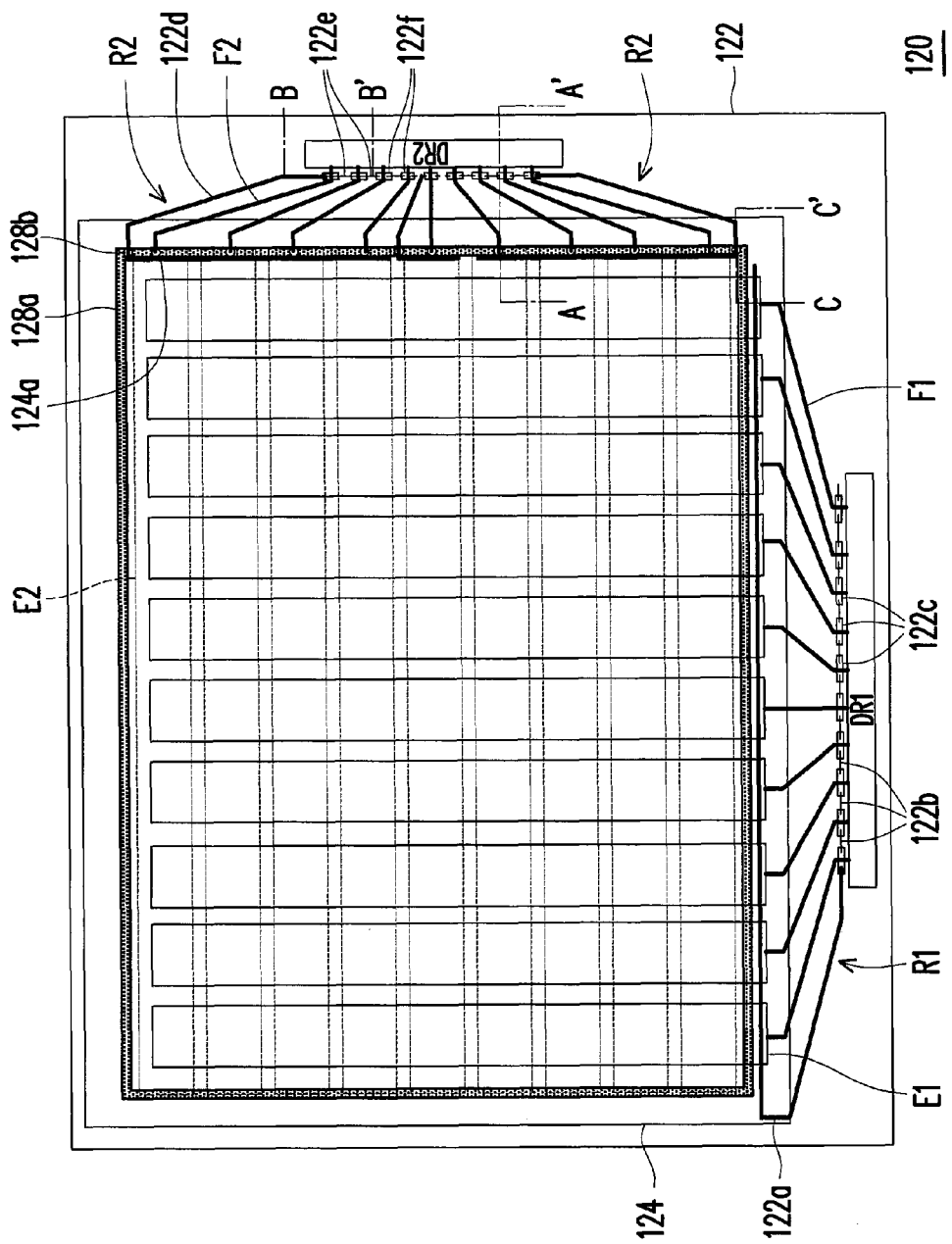
FIG. 2 is a schematic top view illustrating a naked-eye type stereoscopic display according to an exemplary embodiment.
Figure 3A:
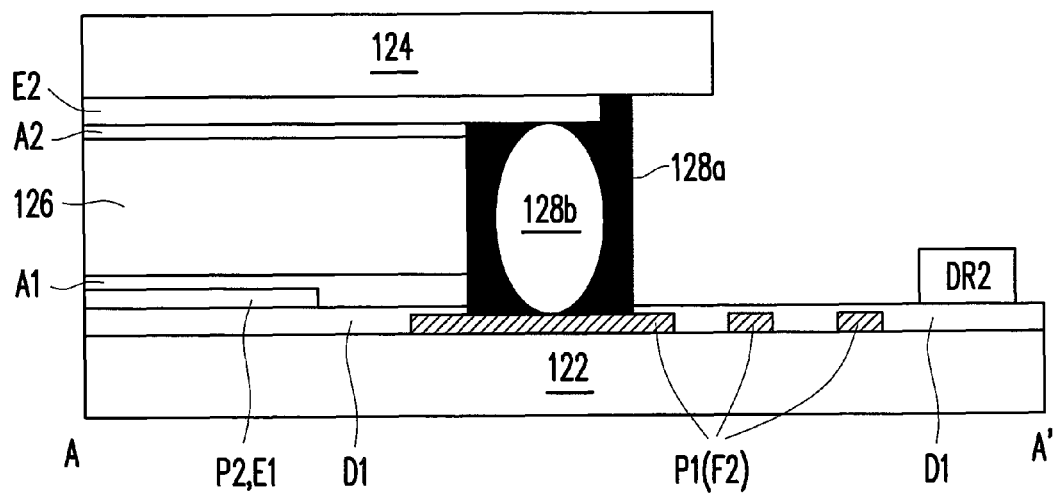
FIG. 3A to FIG. 3C are schematic cross-sectional views respectively taken along section lines A-A', B-B', and C-C' depicted in FIG. 2.
Figure 3B:
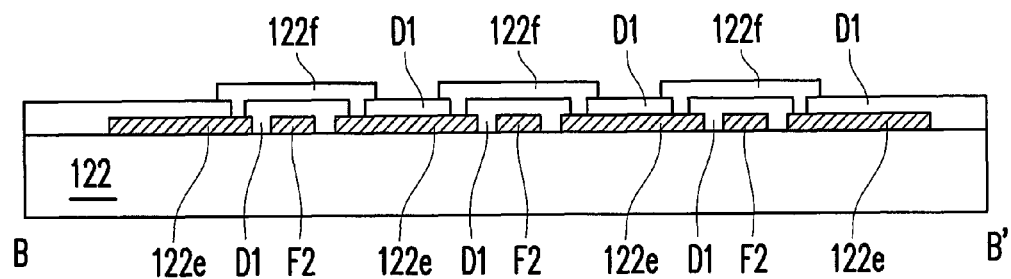
Figure 3C:
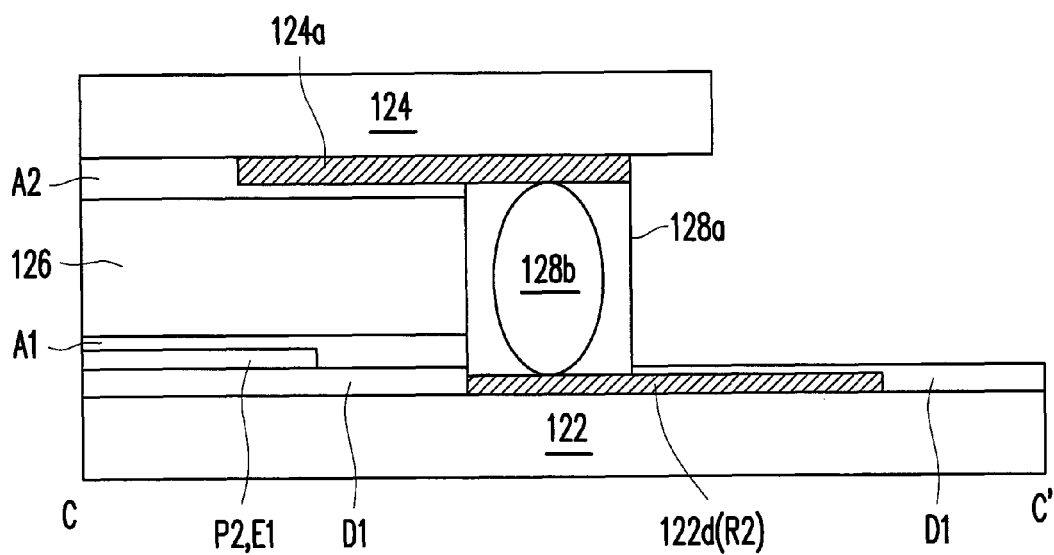

FIG. 1A is a schematic view illustrating a naked-eye type stereoscopic display according to an exemplary embodiment. FIG. 1B and FIG. 1C are schematic views illustrating the naked-eye type stereoscopic display displaying a two-dimensional (2D) image and a stereoscopic image. FIG. 2 is a schematic top view illustrating a naked-eye type stereoscopic display according to an exemplary embodiment. FIG. 3A to FIG. 3C are schematic cross-sectional views respectively taken along section lines A-A', B-B', and C-C' depicted in FIG. 2. With reference to FIG. 1A to FIG. 1C, FIG. 2, and FIG. 3A, the naked-eye type stereoscopic display 100 of the present embodiment includes a display panel 110, a polarization switching panel 120, and a lens array 130. The display panel 110 provides an image IM having a first polarization state PL1. The polarization switching panel 120 is disposed on a propagation path of the image IM. When the polarization switching panel 120 is non-enabled or is disabled, the polarization state of the image IM passing the polarization switching panel 120 switches from the first polarization state PL1 to a second polarization state PL2 (shown in FIG. 1B) different from the first polarization state PL1; when the polarization switching panel 120 is activated or enabled, the image IM passing the polarization switching panel 120 stays in the first polarization state PL1. The first polarization state PL1 and the second polarization state PL2 are both linear polarization states, for instance, and a polarization direction of the first polarization state PL1 is different from that of the second polarization state PL2. In the present embodiment, the first polarization state PL1 and the second polarization state PL2 are two linear polarizations that are substantially perpendicular to each other, for instance.

According to the present embodiment, the display panel 110 includes a pair of substrates (not shown) and a display medium layer (not shown) located between the pair of substrates. The display panel 110 of the present embodiment is an LCD panel, for instance. The display medium layer of the exemplary LCD panel is made of a liquid crystal material. In other embodiments, the display panel may also be a flat panel display having a polarizer (e.g., an outer polarizer, an inner polarizer), so as to provide the image IM having the first polarization state PL1. For instance, the display panel may be an organic electroluminescent display panel having a display medium layer made of an organic light emitting material, a plasma display panel having a display medium layer made of an inorganic light emitting material, a field emission display (FED) panel having a display medium layer made of an inorganic light emitting material, an electrophoretic display panel having a display medium layer made of an electrophoretic material, or an electrowetting display panel having a display medium layer made of an electrowetting material. Moreover, in order to repair the defects of the display panel 110, a rescue line preferably exists on one of the substrates (usually the transistor matrix substrate).

With reference to FIG. 1B and FIG. 1C, the lens array 130 of the present embodiment includes a plurality of lens portions L substantially arranged in parallel and a dielectric layer M. Each of the lens portions L has birefringence, and the dielectric layer M covers the lens portions L. A refractive index (n) of the dielectric layer M is substantially identical to a long axial refractive index (ne) or a short axial refractive index (no) of each of the lens portions L. For instance, the lens portions L are made of a liquid crystal material with birefringence ($\Delta n = ne - no$), i.e., birefringence ($\Delta n$) is not equal to zero. That is to say, birefringence ($\Delta n$) may be substantially greater than or substantially less than 0. In the present embodiment, an optical surface of the lens portions L is a concave surface or a convex surface with proper curvature, which should not be construed as a limitation in the disclosure.

For instance, the refractive index (n) of the dielectric layer M is substantially equal to the long axial refractive index (no) of the lens portions L. Here, the polarization direction of the first polarization state PL1 is substantially parallel to an extension direction of the short axis, for instance, and the polarization direction of the second polarization state PL2 is substantially parallel to an extension direction of the long axis, for instance.

As indicated in FIG. 1B, when the polarization switching panel 120 is non-enabled (or namely disabled), the polarization of the image IM passing the polarization switching panel 120 switches from the first polarization state PL1 to the second polarization state PL2. As to the image IM having the second polarization state PL2, the refractive index of the lens portions L is substantially equivalent to the short axial refractive index (no), and the dielectric layer M and the lens portions L have substantially the same refractive index (no). At this time, the lens array 130 cannot "three-dimensionalize" the image, and the naked-eye type stereoscopic display 100 is capable of providing a 2D image. By contrast, as indicated in FIG. 1C, when the polarization switching panel 120 is activated (or namely enabled), the image IM passing the polarization switching panel 120 stays in the first polarization state PL1. As to the image IM having the first polarization state PL1, the refractive index of the lens portions L is substantially equivalent to the long axial refractive index (ne), and the dielectric layer M and the lens portions L respectively have different refractive indexes, i.e., the refractive index of the dielectric layer M is no, while the refractive index of the lens portions L is ne. At this time, the lens array 130 can "three-dimensionalize" the image, and the naked-eye type stereoscopic display 100 is capable of providing a stereoscopic image.

As indicated in FIG. 2 and FIG. 3A to FIG. 3C, the polarization switching panel 120 of this embodiment includes a first substrate 122, a second substrate 124, and a liquid crystal layer 126. The first substrate 122 has a first conductive pattern P1 (e.g., a metal pattern), a first dielectric layer D1 covering the first conductive pattern P1, a second conductive pattern P2 (e.g., a transparent conductive pattern) disposed on the first dielectric layer D1, a first driver DR1, and a second driver DR2. The first conductive pattern P1 includes a plurality of first fan-out conductive wires F1 connected to the first driver DR1, a plurality of second fan-out conductive wires F2 connected to the second driver DR2, a first portion 122a, and a plurality of second portions 122b located among the first fan-out conductive wires F1. The second conductive pattern P2 includes a plurality of first electrodes E1 connected to the first fan-out conductive wires F1 and a plurality of third portions 122c intersecting the first fan-out conductive wires F1. Here, the first portion 122a intersects the first electrodes E1, and the first portion 122a, the second portions 122b, and the third portions 122c together constitute a first rescue line R1. The second substrate 124 has a plurality of second electrodes E2, and the second fan-out conductive wires F2 are electrically connected between the second electrodes E2 and the second driver DR2. The liquid crystal layer 126 is disposed between the first substrate 122 and the second substrate 124, the lens array 130 is located on the propagation path of the image IM, and the polarization switching panel 120 is located between the lens array 130 and the display panel 110. In the present embodiment, the third portions 122c are connected between two neighboring second portions 122b. It should be mentioned that the first electrodes E1 and the second electrodes E2 need be made of a transparent conductive material with a single-layer structure or a multi-layer structure according to the embodiments in the disclosure; otherwise, given that the first electrodes E1 and the second electrodes E2 are made of a light shielding material, such as metal or alloy materials, images to be displayed are covered by the first electrodes E1 and the second electrodes E2, thus resulting in a defective display.

According to the present embodiment, when one of the first fan-out conductive wires F1 is broken, the broken first fan-out conductive wire F1 may be welded to the corresponding third portion 122c, and the first portion 122a is welded to the corresponding first electrode E1 (such as the first electrode E1 connected to the broken first fan-out conductive wire F1). Thereby, the first rescue line R1 can be applied to repair the broken first fan-out conductive wire F1. For instance, the first rescue line R1 is electrically connected to the broken first fan-out conductive wire F1 through laser welding, for instance. In the present embodiment, the number of the first rescue line R1 is one.

As shown in FIG. 3A, the first substrate 122 of the present embodiment may further has a first alignment film A1, and the second substrate 124 may further has a second alignment film A2. Here, an alignment direction of the first alignment film A1 is substantially parallel to a polarization direction of the linear polarization state (i.e., the polarization direction of the first polarization state PL1 or the polarization direction of the second polarization state PL2), and an alignment direction of the second alignment film A2 is substantially perpendicular to the alignment direction of the first alignment film A1.

It can be learned from FIG. 2 and FIG. 3A that the polarization switching panel 120 of the present embodiment may further include a sealant 128a and a plurality of transfer members 128b. The sealant 128a is disposed between the first substrate 122 and the second substrate 124, and the transfer members 128b are disposed in the sealant 128a. The second electrodes E2 are electrically connected to the second fan-out conductive wires F2 through the transfer members 128b. In order for the transfer members 128b and the second fan-out conductive wires F2 not to affect the transparency of the panel and to maintain the simplicity of fabrication, the transfer members 128b and the second fan-out conductive wires F2 are connected at the forefront and/or the rearmost end of the second electrodes E2 in the application. For instance, the sealant 128a is made of an insulation material, and the transfer members 128b may be conductive balls, conductive pillars, conductive adhesives, or any other appropriate conductive material. The conductive balls and the conductive pillars are formed by wrapping surfaces of balls or pillars in a conductive material, for instance. According to the present embodiment, balls or pillars may be formed on the first substrate 122 or the second substrate 124, and then a conductive material is formed on surfaces of the balls or pillars. Alternatively, a conductive material may be formed on surfaces of the balls or pillars, and then the balls or pillars are configured on the first substrate 122 or the second substrate 124.

The issue of broken lines may not merely occur in the first fan-out conductive wires F1 but also arise in the second fan-out conductive wires F2. In the present embodiment, through the design of the second rescue line R2, the yield reduction issue arising from the broken second fan-out conductive wires F2 can be effectively resolved. In the present embodiment, the second substrate 124 may further include a fourth portion 124a intersecting the second electrodes E2; the first conductive pattern P1 may further include a fifth portion 122d and a plurality of sixth portions 122e, wherein the fifth portion 122d is connected to the fourth portion 124a through one of the transfer members 128b, and the sixth portions 122e are located among the second fan-out conductive wires F2; the second conductive pattern P2 may further include a plurality of seventh portions 122f intersecting the second fan-out conductive wires F2, and each of the seventh portions 122f connects two adjacent sixth portions 122e. Hence, the fourth portion 124a, the fifth portion 122d, the sixth portions 122e, and the seventh portions 122f together formed a second rescue line R2. It should be mentioned that the location where the fourth portion 124a is configured is adjacent to one of the transfer members 128b and the sealant 128a. As indicated in FIG. 2 and FIG. 3C, a portion of the second rescue line R2 is on the first substrate 122, while the other portion of the second rescue line R2 is on the second substrate 124. In addition, the fourth portion 124a may be made of a transparent material or a reflective material. Preferably, the fourth portion 124a is made of the reflective material in the application, so as to provide favorable conductive efficiency.

According to the present embodiment, when one of the second fan-out conductive wires F2 is broken, the broken second fan-out conductive wire F2 may be welded to the corresponding seventh portion 122f, and the fourth portion 124a is welded to the corresponding second electrode E2 (such as the second electrode E2 connected to the broken second fan-out conductive wire F2). Thereby, the second rescue line R2 can be applied to repair the broken second fan-out conductive wire F2. Likewise, the second rescue line R2 is electrically connected to the broken second fan-out conductive wire F2 through laser welding, for instance. In the present embodiment, the number of the second rescue lines R2 is three.

According to the present embodiment, the number of the first and second rescue lines R1 and R2 can be determined based on actual requirements and should not be construed as a limitation to the present embodiment. Moreover, the naked-eye type stereoscopic display 100 of the present embodiment may be equipped with the first rescue line R1, the second rescue line R2, or both the first and second rescue lines R1 and R2.

Figure 4A:
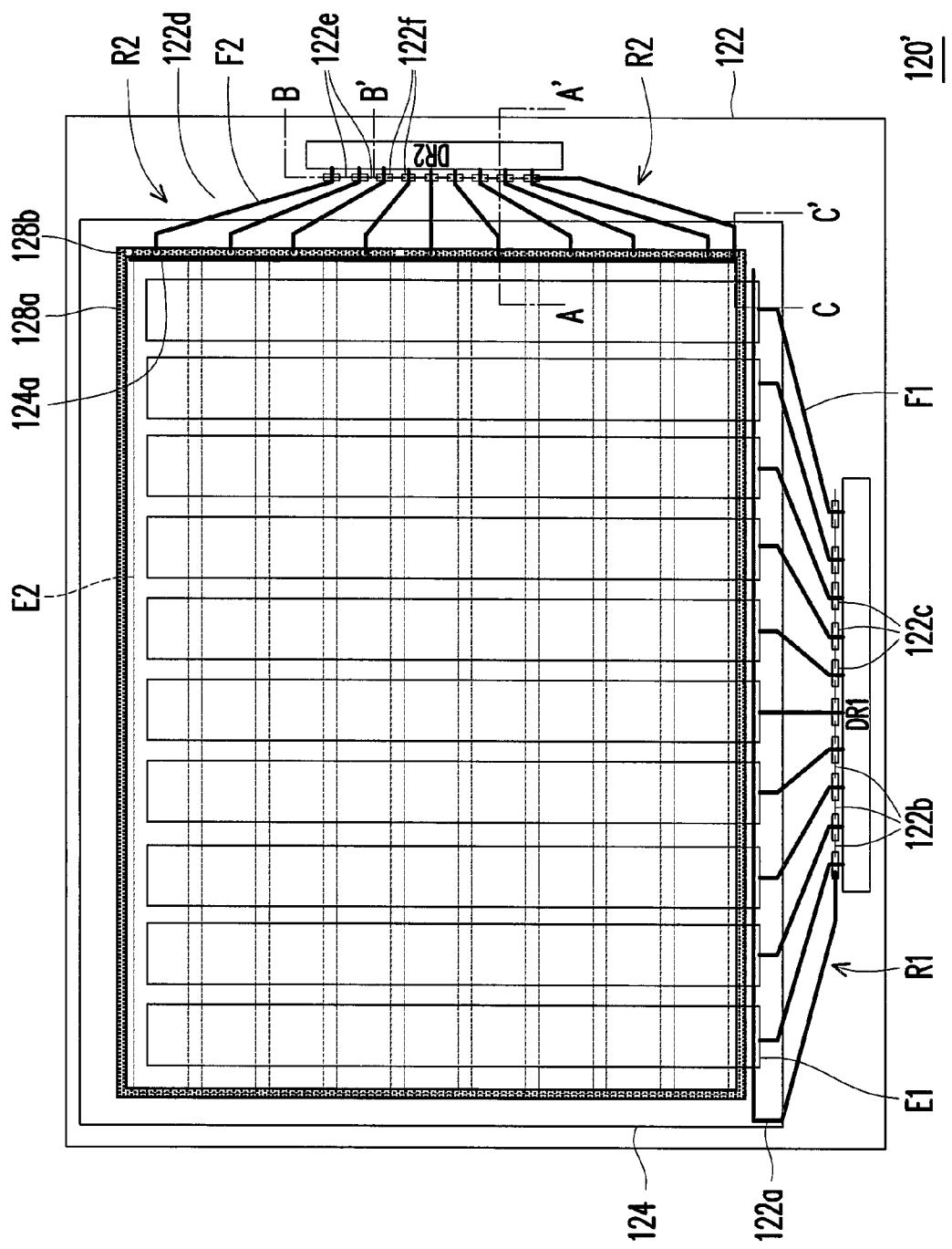
FIG. 4A and FIG. 4B are schematic top views respectively illustrating a naked-eye type stereoscopic display according to other exemplary embodiments.
Figure 4B:
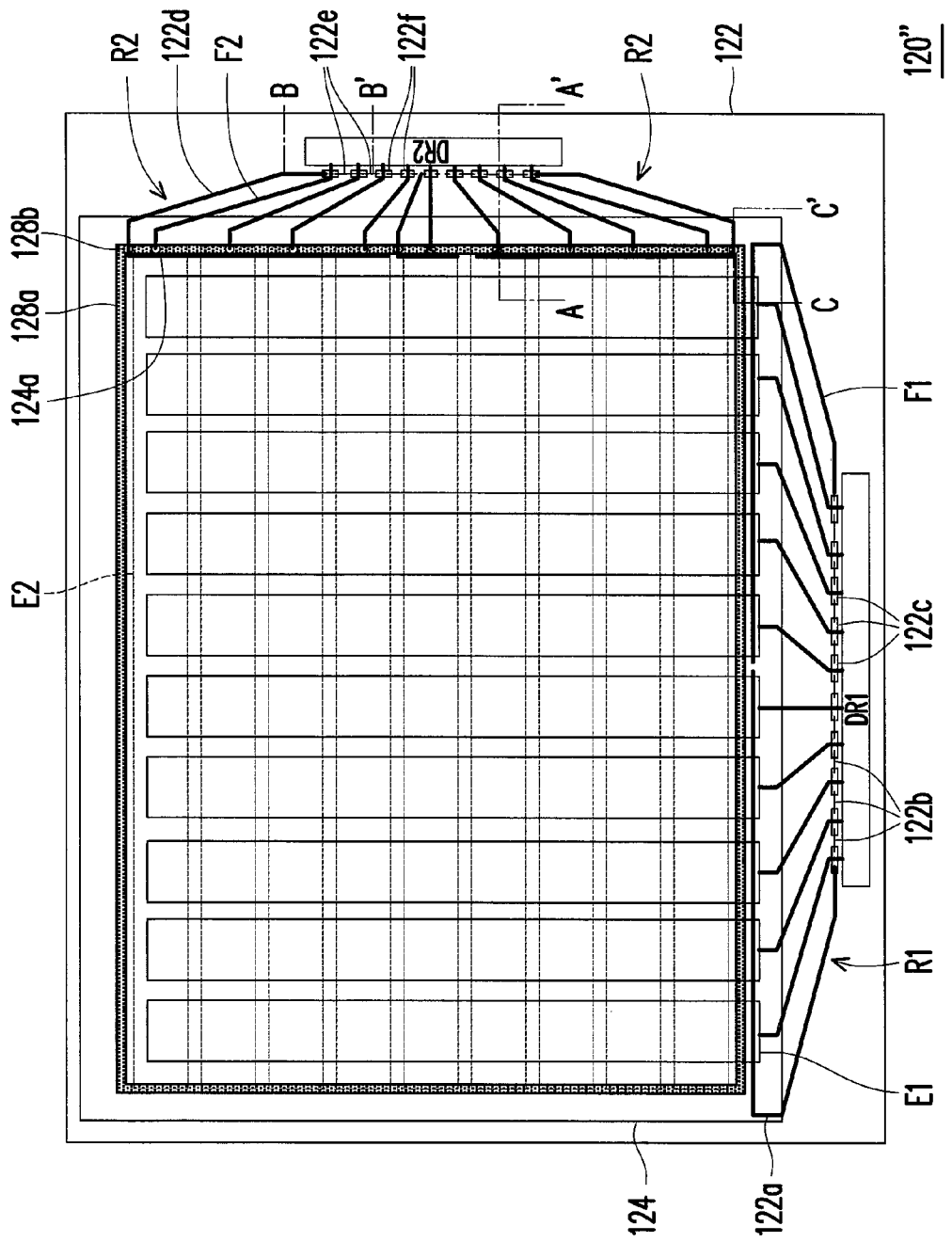

FIG. 4A and FIG. 4B are schematic top views respectively illustrating a naked-eye type stereoscopic display according to other embodiments in the application. With reference to FIG. 4A and FIG. 4B, in the naked-eye type stereoscopic display 100' shown in FIG. 4A, the number of the first rescue line R1 and the number of the second rescue line R2 are both one; by contrast, in the naked-eye type stereoscopic display 100" shown in FIG. 4B, the number of the first rescue lines R1 is two, while the number of the second rescue lines is three.

In light of the foregoing, the rescue line R1 and/or the rescue line R2 is configured on the polarization switching panel 120 in the application. Therefore, the scrap rate of the polarization switching panel 120 in the naked-eye type stereoscopic display 100 can be significantly reduced in the application.

Although the invention has been disclosed by the above embodiments, they are not intended to limit the invention. Those skilled in the art may make some modifications and alterations without departing from the spirit and scope of the invention. Therefore, the protection range of the invention falls in the appended claims.

What is claimed is:

1. A naked-eye type stereoscopic display comprising:
 a display panel providing an image having a first polarization state;
 a polarization switching panel located on a propagation path of the image and comprising:
  a first substrate having a first conductive pattern, a first dielectric layer covering the first conductive pattern, a second conductive pattern disposed on the first dielectric layer, a first driver, and a second driver, wherein the first conductive pattern including a plurality of first fan-out conductive wires connected to the first driver, a plurality of second fan-out conductive wires connected to the second driver, a first portion, and a plurality of second portions located among the first fan-out conductive wires, the second conductive pattern including a plurality of first electrodes connected to the first fan-out conductive wires and a plurality of third portions intersecting the first fan-out conductive wires, wherein the first portion intersects the first electrodes, and the first portion, the second portions, and the third portions together formed a first rescue line;
  a second substrate having a plurality of second electrodes, the second fan-out conductive wires being electrically connected between the second electrodes and the second driver;
  a liquid crystal layer disposed between the first substrate and the second substrate; and
 a lens array located on the propagation path of the image, the polarization switching panel being located between the lens array and the display panel.

2. The naked-eye type stereoscopic display of claim 1, wherein the display panel includes a liquid crystal display panel, and the first polarization state is a linear polarization state.

3. The naked-eye type stereoscopic display of claim 2, wherein a polarization of the image passing the polarization switching panel switches from the first polarization state to a second polarization state different from the first polarization state when the polarization switching panel is disabled, and the polarization of the image passing the polarization switching panel stays in the first polarization state when the polarization switching panel is enabled.

4. The naked-eye type stereoscopic display of claim 3, wherein the first substrate further includes a first alignment film, an alignment direction of the first alignment film is substantially parallel to a polarization direction of the linear polarization state, the second substrate further includes a second alignment film, and an alignment direction of the second alignment film is substantially perpendicular to the alignment direction of the first alignment film.

5. The naked-eye type stereoscopic display of claim 1, wherein the first conductive pattern includes a metal pattern, and the second conductive pattern includes a transparent conductive pattern.

6. The naked-eye type stereoscopic display of claim 1, wherein the polarization switching panel further includes:
 a sealant disposed between the first substrate and the second substrate; and
 a plurality of transfer members disposed in the sealant, wherein the second electrodes are electrically connected to the second fan-out conductive wires through the transfer members.

7. The naked-eye type stereoscopic display of claim 6, wherein the second substrate further includes a fourth portion intersecting the second electrodes, the first conductive pattern further includes a fifth portion and a plurality of sixth portions, the fifth portion is connected to the fourth portion through one of the transfer members, the sixth portions are located among the second fan-out conductive wires, the second conductive pattern further includes a plurality of seventh portions intersecting the second fan-out conductive wires, and the fourth portion, the fifth portion, the sixth portions, and the seventh portions together formed a second rescue line.

8. The naked-eye type stereoscopic display of claim 1, wherein the lens array further includes:
 a plurality of lens portions substantially arranged in parallel, each of the lens portions having birefringence; and
 a dielectric layer covering the lens portions, a refractive index of the dielectric layer being substantially identical to a long axial refractive index or a short axial refractive index of each of the lens portions.

* * * * *